(12) United States Patent
DeMaria et al.

(10) Patent No.: US 6,798,816 B2
(45) Date of Patent: Sep. 28, 2004

(54) FOLDED TAPERED-WAVEGUIDE $CO_2$ LASER

(75) Inventors: Anthony J. DeMaria, Hartford, CT (US); Vernon A. Seguin, Windsor, CT (US); Lanny Laughman, Bolton, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/277,272

(22) Filed: Oct. 21, 2002

(65) Prior Publication Data

US 2004/0076210 A1 Apr. 22, 2004

(51) Int. Cl.[7] ................................................. H01S 3/03
(52) U.S. Cl. ........................... 372/64; 372/55; 372/7; 372/46
(58) Field of Search ............................ 372/64, 87, 96

(56) References Cited

U.S. PATENT DOCUMENTS

| | | | |
|---|---|---|---|
| 4,500,996 A | 2/1985 | Sasnett et al. ................ 372/19 |
| 4,688,228 A | 8/1987 | Newman et al. ............. 372/18 |
| 5,020,074 A | 5/1991 | Lerfald ....................... 372/107 |
| 5,021,742 A | * 6/1991 | Jacob .......................... 359/347 |
| 5,570,205 A | * 10/1996 | Ota ............................ 359/333 |
| 5,894,535 A | * 4/1999 | Lemoff et al. ................ 385/47 |
| 6,192,061 B1 | * 2/2001 | Hart et al. .................... 372/87 |
| 6,256,332 B1 | * 7/2001 | Anikitchev ................... 372/93 |
| 6,373,866 B1 | * 4/2002 | Black ........................... 372/16 |

FOREIGN PATENT DOCUMENTS

| | | | |
|---|---|---|---|
| WO | WO 02/05396 A1 | 1/2002 | ........... H01S/3/097 |
| WO | WO 02/084823 A1 | 10/2002 | ........... H01S/3/041 |

OTHER PUBLICATIONS

P.E. Jackson, et al., "Comparisons of waveguide folding geometries in a $CO_2$ z–fold laser", Applied Optics, vol. 28, No. 5, Mar. 1, 1989, pp. 935–941.

* cited by examiner

*Primary Examiner*—Don Wong
*Assistant Examiner*—Dung Nguyen
(74) *Attorney, Agent, or Firm*—Stallman & Pollock LLP

(57) ABSTRACT

A folded waveguide $CO_2$ laser includes a plurality of waveguides arranged in a zigzag pattern with ends thereof overlapping. The laser includes a resonator having an axis extending through the plurality of waveguides. At least a portion of at least one of the waveguides has a uniform minimum width selected cooperative with the height of the waveguide and the laser wavelength such that the resonator can oscillate in only a single mode. At least a portion of one of the waveguides is tapered such that its width increases in one direction along the resonator axis. Tapering one or more of the waveguides provides that the total waveguide area and potential power output of the laser is greater than that of a zigzag arrangement of waveguides having the same total length waveguides each having a uniform width equal to the minimum width of the waveguide in the tapered waveguide arrangement.

32 Claims, 5 Drawing Sheets

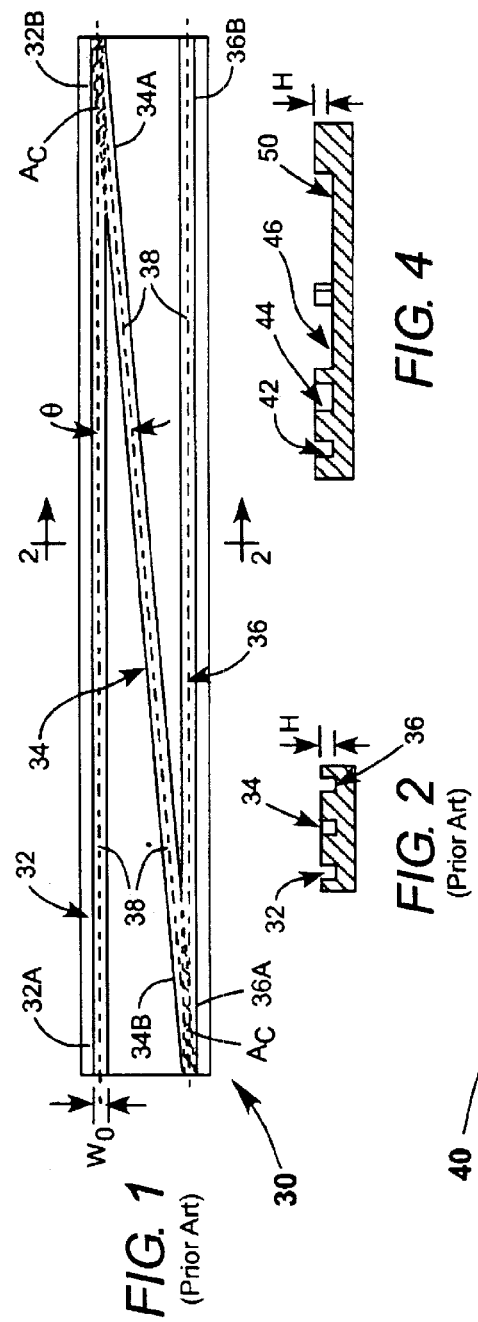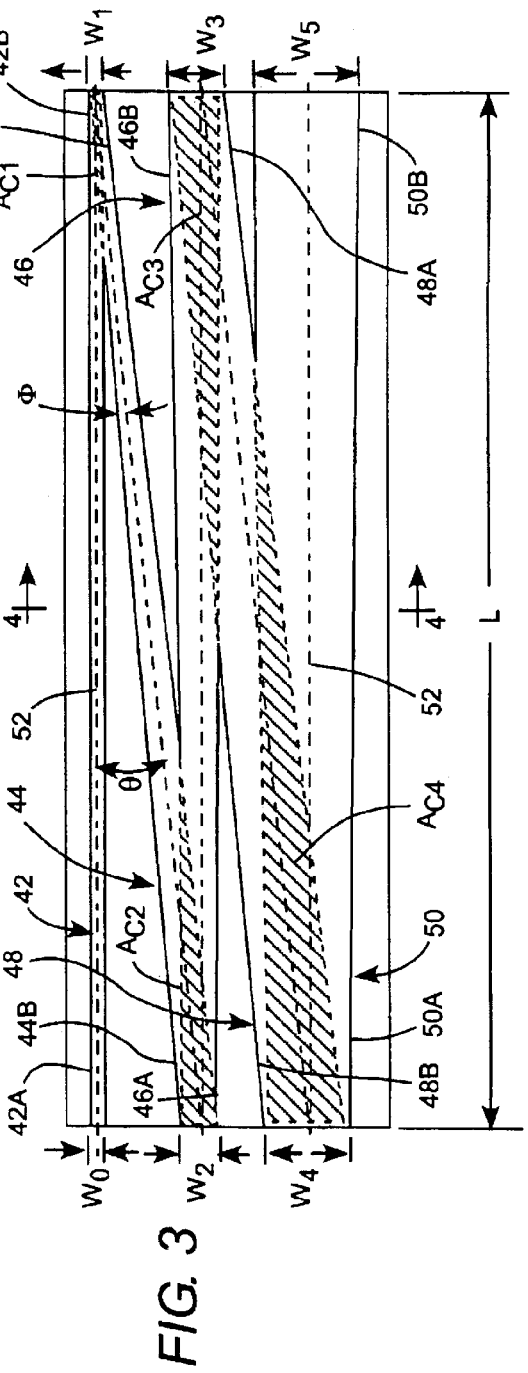

FOLDED TAPERED-WAVEGUIDE $CO_2$ LASER

TECHNICAL FIELD OF THE INVENTION

The present invention relates generally to radio frequency (RF) excited, diffusion-cooled, sealed-off $CO_2$ lasers. The invention relates in particular to a waveguide $CO_2$ laser including a tapered-waveguide gain-region.

DISCUSSION OF BACKGROUND ART

There are three types of RF-exited, diffusion-cooled $CO_2$ lasers in common use. These are the slab laser, the folded waveguide laser, and the folded, free-space-resonator laser. In a folded free-space-resonator laser, lasing modes are determined primarily by the configuration of mirrors forming the laser resonator. A slab laser includes a laser resonator in which the lasing mode or modes are constrained in one of two mutually perpendicular directions, transverse to the resonator axis, by slab-like electrodes used to excite an RF discharge in the lasing ($CO_2$) gas. The mode shape in the other transverse direction is determined by the configuration of mirrors forming the resonator. In a folded waveguide laser, lasing modes are constrained in mutually perpendicular directions in zigzag arrangement of waveguide-channels in a dielectric slab, typically a slab of a ceramic material. The ceramic slab is bounded by electrodes for exciting an RF discharge in a lasing gas in the waveguide-channels. It is generally accepted that the power output of slab lasers scales with the discharge area for a given electrode spacing while the power out put of prior-art waveguide lasers scales with length.

Slab $CO_2$ lasers have the highest power output capability. Slab lasers having a power output of 1000 Watts (W) are commercially available. It is generally accepted, however, that waveguide $CO_2$ lasers have superior mode-quality to that of slab lasers and have higher efficiency. One factor contributing to the higher efficiency is diffusion cooling in both the height and width of the waveguide dimensions. One factor contributing to this superior mode-quality is the use of waveguide dimensions that constrain lasing into a single oscillation mode. The higher efficiency and superior mode-quality are presently obtained at lower output power than is available in commercial slab lasers. Waveguide $CO_2$ lasers are commercially available with power outputs in a range between 25 W and 140 W, although waveguide lasers with power outputs up to 300 W have been custom produced for specialized applications.

FIGS. 1 and 2 schematically illustrate a prior art waveguide-block 30 of a type used in a prior-art waveguide $CO_2$ laser. Other features of the laser such as gas containment arrangement, resonator mirrors, arrangements for sustaining an RF discharge, and cooling arrangements are omitted from FIG. 1 for convenience of illustration. Such features are well known to those skilled in the art to which the present invention pertains. A detailed description of a prior art laser including such a waveguide-block is given in U.S. Pat. No. 6,192,061 the complete disclosure of which is hereby incorporated by reference.

Waveguide-block 30 is typically formed from a ceramic material such as high density Aluminum Oxide ($Al_2O_3$) and includes two or more waveguide-channels, with 3 to 7 channels being preferred. Three waveguide-channels (waveguides) 32, 34 and 36 are depicted in FIGS. 1 and 2. Each waveguide has a height or depth H and a width W, each of which is assumed, here, to be constant. There is little freedom in varying the cross sectional dimensions H and W of a waveguide if single mode operation is desired. By way of example, dimensions of a single-mode waveguide-channel for a $CO_2$ laser are about 0.28 centimeters (cm) high, and between about 0.28 and 0.47 cm wide.

A longitudinal resonator axis 38, folded into a Z-shape by mirrors (not shown in FIG. 1) extends through the waveguides. Waveguides 32, 34, and 36 are arranged at an angle θ from each other to accommodate the folded resonator axis. Angle θ is exaggerated in FIG. 1 for convenience of illustration. In practice, angle θ is relatively small, for example less than about fifteen degrees (15°) with about 6° or less being preferred. End 32B of waveguide 32 overlaps (is juxtaposed with) end 34A of waveguide 34. End 34B of waveguide 34 overlaps end 36A of waveguide 36. The degree of overlap depends on angle θ and the distance at which mirrors (not shown) used to fold the resonator axis 38 are located from the ends of the waveguides. Those skilled in the art will be aware that this distance and the angle θ are usually kept as small as practically possible to minimize the length and the width of the laser. The selection of the angle θ is a design compromise between keeping the width of the laser small, and minimizing the waveguide overlap area. Reducing θ reduces laser width, while increasing θ decreases the overlap area. Reducing θ also reduces the positioning sensitivity of the folding mirror for ease of resonator alignment.

Given that height H is constant, total laser power output capability provided in the uniform-width waveguides is proportional to the total area (width times length) of the waveguides. The overlapping or juxtaposition of the waveguides gives rise to common areas ($A_C$) of the waveguides that can be considered to provide gain in only one of the waveguides or the other. Common areas $A_C$ are small compared with the total waveguide area for an angle θ less than 6°. Similarly, the length of waveguide 34 can be considered to be approximately equal to the length of waveguides 32 and 36. Accordingly, the total area of the waveguides can be considered as approximately equal to the product of the number of waveguides (here, 3), the waveguide width W, and the length of any one of the waveguides. In other words, the power output of single-mode, waveguide $CO_2$ lasers scales with the total length of the waveguides for a given width and height of the waveguide. By way of example, a total waveguide length of about 2.3 meters (m) may be required for an output power of about 150 W. A waveguide-block 30 having five folded channels providing a total waveguide length of 2.3 m may be about 47.5 centimeters (cm) long and about 7.6 cm wide.

One potential limit to the prior-art folded-resonator or folded waveguide approach to increasing total waveguide length is that, for a fixed physical length of a single waveguide, the folded waveguide-block can become as wide as it is long if the number of waveguides is increased. In addition, increasing the number of waveguides increases the number of mirrors required to fold the resonator axis to the point where alignment of the mirrors becomes very difficult. Further, as dimensions of a folded-resonator laser-package and output power increase, it becomes increasingly difficult to design uniform cooling arrangements for the laser-package that minimize temperature gradients.

Temperature gradients resulting from non-uniform cooling can cause flexing of a laser housing, resulting in beam pointing errors, among other problems. Difficulty in obtaining ceramic blocks greater than one meter in length also limits the length and thus the power scaling of $CO_2$ waveguide lasers.

Increasing the number of waveguides increases the total area of the laser, which, in turn, increases the area of electrodes needed to maintain the RF discharge in the waveguides. As the electrode area increases, the capacitance seen by an RF power supply energizing the electrodes increases causing a decrease in impedance. The lower the impedance the more difficult it is to couple RF energy into the discharge.

Still another problem encountered in power scaling waveguide-lasers is damage to intra-resonator optical components, particularly optically coated components. In prior art $CO_2$ waveguide lasers operated in a cavity-dumped, Q-switched, pulsed mode, for example, it is possible that intra resonator power density (power per unit area) can reach the damage threshold of intra-resonator optical components such as electro-optic switches (EO-switches) and reflective phase retarders used to implement the Q-switching and cavity dumping. Pulsed peak power-density may be on the order of several megawatts per square centimeter (MW/$cm^2$). At this level, optical coatings on a reflective phase-retarder and anti-reflection coatings on transparent windows on the EO-switch can begin to damage after as little as 100 hours of laser operation.

There is a need to increase the power output of a single-mode waveguide $CO_2$ laser while keeping overall dimensions comparable with prior-art, folded-resonator, waveguide $CO_2$ laser. Preferably, this power increase should be achieved without sacrifice of reliability, mode-quality, beam pointing stability and ease of coupling RF energy into the discharge.

SUMMARY OF THE INVENTION

In one aspect, a laser in accordance with the present invention comprises a laser resonator having a resonator axis folded by mirrors into a zigzag pattern. The resonator axis extends through a plurality of waveguides. Adjacent ones of the waveguides are arranged end-to-end at an angle to each other to conform to the zigzag pattern of the resonator axis. The width of at least one of said waveguides is tapered from a narrowest width at one end thereof to a widest width at an opposite end thereof. Two or more of such tapered waveguides can be utilized.

Preferably at least one of the waveguides is selected as a mode-filtering waveguide. The mode-filtering waveguide is characterized in that it has a uniform width selected, cooperative with the length and height of the waveguide, such that laser-radiation generated in the laser resonator can oscillate in only a single oscillating mode. Two such mode-filtering waveguides may be included in the waveguide arrangement Tapering the width of one or more of the waveguides according to the present invention allows the cross-sectional area power-saturation intensity per unit length of the resonator to increase with the resonator length. Additionally including the mode-filtering waveguide or waveguides, may provide that a single-mode folded resonator in accordance with the present invention can have a higher overall power output than a prior-art, folded, single-mode uniform-width waveguide resonator having the same number of folds and the same total (axial) length.

Various embodiments disclosed herein employ one or more uniform width waveguides and one or more tapered waveguides, combined in various orders. The specific embodiments are intended to be illustrative of some useful combinations but should not be viewed as limiting the invention to the particular configurations discussed in this summary or in the detailed description. Those skilled in the art could conceive of other combinations that those discussed herein.

In one preferred embodiment of the inventive laser, the folded resonator-axis extends through first, second, third, fourth, and fifth waveguides arranged end-to-end, in listing order, at an angle to each other to conform to the zigzag pattern. The first waveguide has a width tapering from a widest width at a first end thereof to a narrowest width at an opposite end thereof. The second and third waveguides have a first uniform width equal to the narrowest width of the first waveguide. The first uniform width is selected cooperative with the height and length of the waveguides such that the resonator will support only a single oscillating mode. The fourth waveguide has a width tapering from the first uniform width at a first end thereof to a maximum width at an opposite end. The first end of the fourth waveguide is juxtaposed with an end of the third waveguide. The fifth waveguide has a second uniform width equal to the maximum width of the fourth waveguide. The laser resonator is terminated between two resonator mirrors. One of the resonator mirrors is a plane mirror and the other is a concave mirror.

In one example of this embodiment, the laser resonator has optical components for Q-switching located on the resonator axis between said first mirror and the uniform-width fifth waveguide. The uniform width of the fifth waveguide provides that laser-radiation output is collimated. The width of the fifth waveguide is selected to reduce power density on the Q-switching components to reduce the possibility of damaging the components.

In general, for a given waveguide height (H) and gas pressure used, the power output of a tapered-waveguide laser in accordance with the present invention scales with total length of the waveguides plus the increased discharge area contributed by the tapered waveguide or waveguides. The inventive tapered-waveguide laser has a capability to extend the power output of waveguide lasers into the power range of above-discussed prior-art slab lasers, while maintaining the mode-quality associated with prior-art waveguide lasers.

In another aspect of the present invention, a laser comprises a laser resonator having a resonator axis folded by mirrors into a zigzag pattern. The resonator axis extends through at least four waveguides. Adjacent ones of the waveguides are arranged end-to-end at an angle to each other to conform to the zigzag pattern of the resonator axis. One of the mirrors is a plane mirror arranged to fold the resonator axis more than once. This can provide for simpler alignment of resonator mirrors than in an arrangement where each folding mirror folds the resonator axis only once. This simpler alignment may be enjoyed in a folded waveguide laser in which all of the waveguides have a uniform width.

In yet another aspect of the present invention, a laser comprises a laser resonator including a plurality of waveguides arranged end-to-end along a resonator axis. The resonator axis is folded by at least two mirrors into a zigzag pattern. Adjacent ones of the waveguides are arranged at an angle to each other to conform to the zigzag pattern. One of the angles between waveguides is different from another of the angles between waveguides.

In one embodiment of this unequal-angle, folded-resonator, waveguide laser there is an arrangement of two uniform-width waveguides and two tapered waveguides. The uniform-width waveguides have a width about equal to the minimum width of the tapered waveguides, and the tapered waveguides are located centrally in the arrangement with the widest ends thereof overlapping. The angle between the tapered waveguides is twice the angle between a tapered waveguide and the adjacent uniform-width waveguide. Providing the greater angle between the tapered waveguides reduces loss of potential gain due to overlapping of the waveguides at the juxtaposed ends thereof.

In still another aspect of the present invention, a laser amplifier includes a plurality of waveguides arranged end-to-end along an amplifier axis. The amplifier axis is folded by at least two mirrors into a zigzag pattern. Adjacent ones of the waveguides are arranged at an angle to each other to conform to the zigzag pattern. At least one waveguide has a width tapered from a narrowest width at one end thereof to a widest width at an opposite end thereof. Laser-radiation to be amplified enters the tapered waveguide at the narrowest end thereof and exits said tapered waveguide at the widest end thereof.

In one embodiment of the inventive amplifier, all of the waveguides are tapered from a narrowest width at one end thereof to a widest width at an opposite end thereof. The waveguides are arranged in one axial direction with the narrowest end of one thereof juxtaposed with and having the same width as the widest end of the preceding one thereof. Laser-radiation to be amplified enters each of the waveguides at the narrowest end thereof and exits at the widest end thereof.

The present invention is summarized above in terms of a number of aspects, embodiments, and advantages thereof. A detailed description of the present invention is presented hereinbelow. Those skilled in the art may recognize from this detailed description, other aspects, embodiments and advantages of the present invention without departing from the spirit and scope of the present invention.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

FIG. 1 is a plan view schematically illustrating a waveguide-block of a prior-art waveguide $CO_2$ laser including channels forming three waveguides arranged generally in a zigzag pattern.

FIG. 2 is a cross section view of the waveguide-block of FIG. 1, seen generally in the direction 2—2 of FIG. 1.

FIG. 3 is a plan view schematically illustrating a waveguide-block of a waveguide $CO_2$ laser in accordance with the present invention including channels forming five waveguides arranged in a zigzag pattern.

FIG. 4 is a cross section view of the waveguide-block of FIG. 1, seen generally in the direction 4—4 of FIG. 1.

DETAILED DESCRIPTION OF THE INVENTION

Figure 5:
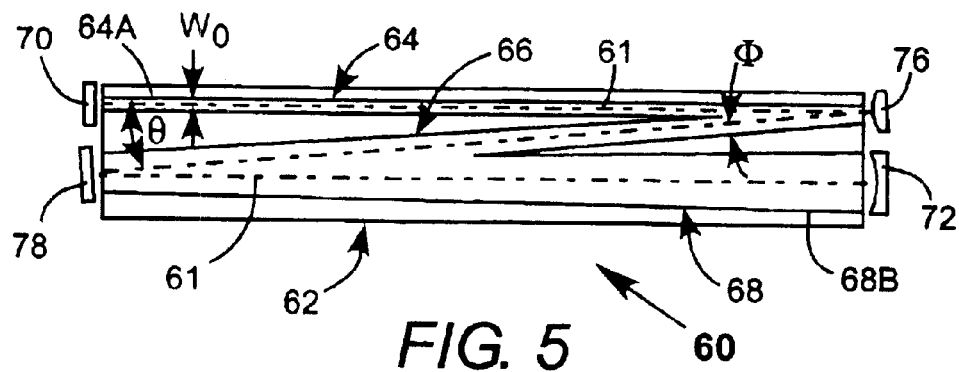
FIG. 5 schematically illustrates a preferred embodiment of a laser resonator in accordance with the present invention including a zigzag arrangement of one uniform-width waveguide and two tapered waveguides, with the uniform-width waveguide at one end of the waveguide arrangement.

Referring again to the drawings, wherein like features are designated by like reference numerals, FIGS. 3 and 4 schematically illustrate one preferred embodiment of a waveguide-block or monolithic waveguide-assembly 40 for a folded-resonator waveguide $CO_2$ laser in accordance with the present invention. As in the case of above-discussed waveguide-block 30 of FIG. 1, other features of the laser such as gas containment arrangement, resonator mirrors, power-supply and arrangements for sustaining an RF discharge, and cooling arrangements are omitted from FIG. 3 for convenience of illustration.

Waveguide-block 40 is formed from a dielectric material, such as high-density $Al_2O_3$, and includes five waveguide-channels (waveguides) 42, 44, 46, 48 and 50. Waveguide 42 has a uniform width; all other waveguides are tapered in width. A longitudinal resonator axis 52, folded by mirrors (not shown in FIG. 3) extends through the waveguides. Waveguide 42 has height or depth H selected cooperative with gas pressure and RF excitation frequency. Waveguide 42 has a width $W_0$ selected cooperative with height H and the length of waveguide 42 such that the waveguide, and accordingly the resonator, supports only a single oscillation mode. H and $W_0$ assumed, here, to be constant.

A waveguide laser may be characterized by a dimensionless quantity referred to as the Fresnel number (F). The Fresnel number in the inventive folded-waveguide laser is specified in the width and height directions as $F_W$ and $F_H$ respectively, where $F_W = W_0^2/(4 M L \lambda)$ and $F_H = H^2/(4 M L \lambda)$, and where $\lambda$ is the lasing wavelength, M is the number of uniform-width waveguides and L is the waveguide length. $W_0$ can be equal to or different from H depending on beam cross-section requirements. For good mode-quality, i.e. lowest-order or single-mode operation, both $F_W$ and $F_H$ are preferably less than about 0.3.

Waveguide 44 is inclined at an angle $\theta$ to waveguide 42. Here again, angle $\theta$, in practice, is relatively small and is exaggerated in FIG. 3 for convenience of illustration. Angle $\theta$, is preferably between about 2° and 6°. Waveguide 44 is tapered in width from a minimum width $W_1$ (where, here, $W_0 = W_1$) at end 44A thereof to a maximum width $W_2$ at opposite end 44B thereof. Waveguide 46 tapers from a width $W_2$ to a width $W_3$. Waveguide 48 tapers from a width $W_3$ to a width $W_4$. Waveguide 50 tapers from a width $W_4$ to a width $W_5$.

The taper angle $\Phi$ of the tapered waveguides is selected according to the amount of waveguide overlap ($A_{c1}$, $A_{c2}$ - - - $A_{c5}$) that can be tolerated in keeping with a selected length (L) of the waveguide-block and a desired efficiency and power output from the laser. In most embodiments of the inventive laser, $\Phi$ is preferably less than about one degree (1°). The divergence of the laser beam coupled into the tapered waveguides from the uniform-width waveguides is made to match the taper angle $\Phi$ by curved folding mirrors (not shown in FIG. 3) whose curvatures are selected for this purpose. Adjacent waveguides 44, 46, 48, and 50 are inclined at an angle $\theta$ to each other. It is not necessary that the inclination angle $\theta$ of these waveguides be the same but, for ease of mirror alignment, the same angle is often preferred. End 42B of waveguide 42 overlaps end 44A of waveguide 44 in a common area $A_{C1}$. End 44B of waveguide 44 overlaps end 46A of waveguide 46 in a common area $A_{C2}$. End 46B of waveguide 46 overlaps end 48A of waveguide 48 in a common area $A_{C3}$. End 48B of waveguide 48 overlaps end 50A of waveguide 50 in a common area $A_{C4}$. The areas of overlap are dependent on the length (L) of the waveguides, width $W_0$ and angles $\theta$ and $\Phi$. For the small values of $\theta$ being considered here, it may be assumed that all waveguides have about equal length L, here, the length of waveguide-block 40. The magnitude of the common areas can readily be determined trigonometrically.

Unlike the uniform-width waveguide example of FIG. 1, the common areas $A_{C2}$, $A_{C3}$, and $A_{C4}$, resulting from overlap of tapered waveguides 44, 46, 48, and 50 can represent a significant portion of the total waveguide area and must be subtracted from the total waveguide area to determine the fraction thereof that can provide laser output power. The amount of output power from a $CO_2$ laser scales with the discharge volume or with the discharge area for a given waveguide height. Accordingly, a laser in accordance with the present invention, having a given number of inclined tapered waveguides, wherein the smallest waveguide width is $W_0$, has a greater effective output-power-providing discharge volume than that of a prior-art laser having the same number of waveguides, similarly inclined, all having a uniform width of $W_0$. A discussion of various laser resonator arrangements including tapered waveguides in accordance with the present invention is set forth below with reference to FIGS. 5–12.

FIG. 5 schematically depicts a laser resonator 60 having a waveguide-block 62 including one uniform-width waveguide 64, and two tapered waveguides 66 and 68 in a Z-shaped zigzag arrangement. The width and height of waveguide 64 is selected to provide a Fresnel number of about 0.3 or less for a given length L. This enables waveguide 64 to discriminate against higher-order modes and forces resonator 60 to support only a single oscillating mode. It is assumed in the case of laser resonator 60, and other resonators discussed hereinbelow, that all waveguides have the same constant height. This, however, should not be construed as limiting the present invention.

Laser resonator 60 is formed between a plane mirror 70 and a concave cylindrical mirror 72. A resonator axis 61 extends through the waveguides. The resonator axis is folded to conform to the zigzag arrangement of waveguides by a convex cylindrical fold-mirror 76 and a plane fold mirror 78.

The curvature of the concave cylindrical mirror 72 is selected to reflect light rays (not shown), diverging at angle $\Phi$ in the width-dimension of waveguide, 68 back (converging) to the cylindrical convex mirror 76. Mirror 76 The curvature of the convex mirror 76 is selected to collimate the converging rays to fill the lowest order mode of uniform-width waveguide 64, and to diverge light rays coming out of the single-mode waveguide 64 an angle $\Phi$ in the width dimension to fill the lowest order mode of the tapered waveguide 66. Those skilled in the art will recognize that the term cylindrical as applied to mirrors 72 and 76 and like mirrors discussed further hereinbelow means that the mirrors have optical power in only one axis transverse to resonator axis 61.

For a taper angle $\Phi$ of 1.0 degree or less, the radius of curvature of mirrors 72 and 76 is very large, for example, greater than about 48 cm. Because of this, spherical mirrors can be utilized in place of cylindrical mirrors 72 and 76 although some reduction in performance may be experienced. The use of cylindrical mirrors in embodiments of the present invention described herein should not be construed as limiting the present invention.

In waveguide-block 62, cross-section dimensions of uniform-width waveguide 64 are preferably arranged to guide only one mode of oscillation in order for it to act as a higher mode discriminator for resonator. Accordingly, laser resonator 60 would oscillate in a single mode even should cross-section dimensions of tapered waveguides 66 and 68 be sufficient to support multiple modes of oscillation.

Figure 6:
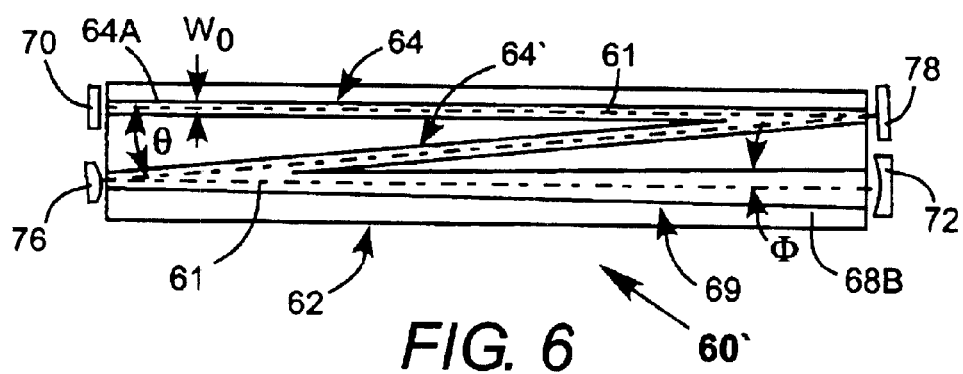
FIG. 6 schematically illustrates a preferred embodiment of a laser resonator in accordance with the present invention including a zigzag arrangement of two uniform-width waveguides and one tapered waveguide, with the uniform-width waveguides at one end and the center of the waveguide arrangement.

In cases where it is not possible to obtain a small enough Fresnel number for mode-discrimination in uniform-width waveguide 64, for example, if the waveguide length L were insufficient, it is possible to replace tapered waveguide 66 with another uniform-width waveguide, thereby leaving only one tapered waveguide. By way of example, FIG. 6 schematically illustrates a resonator 60A similar to resonator 60 of FIG. 5 with an exception that waveguide 66 of resonator 60 is replaced in resonator 60A by a uniform-width waveguide 64', having the same width as waveguide 64. Tapered waveguide 68 of resonator 60 is replaced in resonator 60A by a generally narrower tapered waveguide 69. It is possible to increase the taper angle of this waveguide to at least partially compensate for waveguide area lost in substituting uniform width waveguide 64' for a tapered waveguide. In resonator 60', a convex cylindrical fold mirror 76 is located at end 69A of waveguide 69, and plane fold mirror 78 is located at the junction of uniform-width waveguides 64 and 64'.

In resonators 60 and 60A, either plane mirror 70 or concave cylindrical mirror 72 can be arranged to be partially transmissive for allowing laser-radiation to be coupled out of the resonator. If mirror 70 is arranged to be the output-coupling mirror a collimated output beam will be obtained.

If mirror 72 is arranged to be the output-coupling mirror a diverging output beam will be obtained. As the selection of materials and reflectivity values for resonator mirrors is well known in the art, a detailed discussion of such selection is not provided herein.

Figure 7:
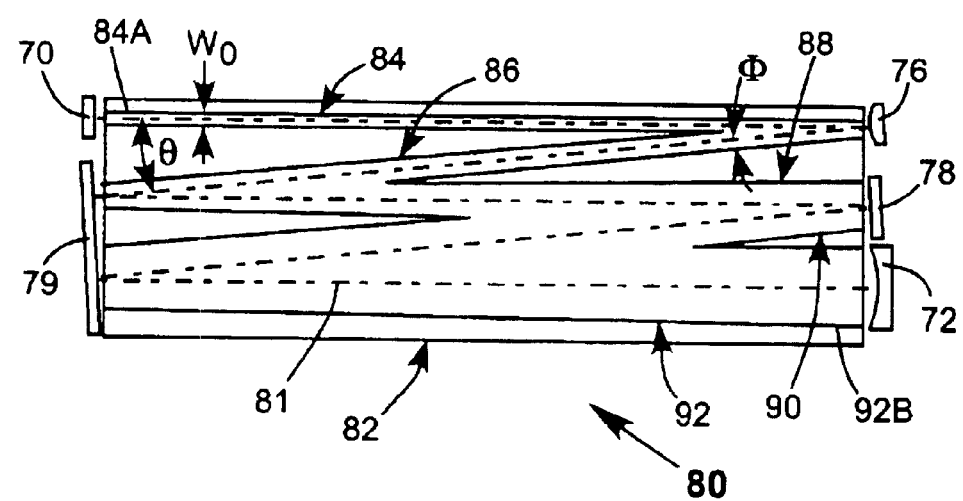
FIG. 7 schematically illustrates another preferred embodiment of a laser resonator in accordance with the present invention including a zigzag arrangement of one uniform-width waveguide and four tapered waveguides, with the uniform-width waveguide at one end of the waveguide arrangement.

FIG. 7 schematically depicts a laser resonator 80 having a waveguide-block 82 including one uniform-width waveguide 84 and four tapered waveguides 86, 88, 90, and 92 in a zigzag arrangement often referred to by practitioners of the art as an NV-folded arrangement. Laser resonator 80 is formed between a plane mirror 70 and a concave cylindrical mirror 72. A resonator axis 81 extends through the waveguides. The resonator axis is folded to conform to the zigzag arrangement of waveguides by a convex cylindrical fold-mirror 76 and plane fold-mirrors 78 and 79.

Mirror 79 is sufficiently large that it serves as a fold-mirror at the junction of waveguides 86 and 88 and also at the junction of waveguides 90 and 92. In other words, the mirror folds the resonator axis more than once. This has an advantage that it provides for simpler resonator alignment than would be the case if a separate mirror were located at each of the junctions. It should be noted, here, that this alignment advantage is independent of whether waveguides are tapered or not and may be enjoyed in folded waveguide lasers having only uniform-width waveguides.

It is also possible that resonator 80 may be modified by replacing tapered waveguide 86 with another uniform-width waveguide 84, as discussed above with reference to resonators 60 and 60A of FIGS. 5 and 6. Those skilled in the art will recognize from the discussion provided above, without further illustration, that, in this, case common fold mirror 79 must be replaced by separate mirrors at each junction, one thereof being a convex mirror at the junction of a uniform-width and a tapered waveguide. A plane mirror would be required at the junction of the two uniform-width waveguides. This could be provided in a mirror 78, or in a plane mirror 79 long enough to fold the resonator axis additionally at the junction of waveguides 88 and 90.

The embodiments of the present invention discussed above with reference to FIGS. 5, 6, and 7 may be generally described as including an integer total number (N) of waveguides designated the first through the Nth where N is at least three and where at least one of the waveguides has a tapered width. The waveguides are arranged in consecutive numerical order along the resonator axis. At least one of the waveguides has a uniform width selected cooperative with the length and height of the waveguide such that laser-radiation generated in the laser resonator can oscillate in only a single oscillating mode. The other N−M or (where M represents the number of uniform-width waveguides) all are tapered in width from a narrowest width to a widest width. In general, the narrowest width of the Nth waveguide is about equal to the widest width of the (N−1)$^{th}$ waveguide. The widest and narrowest widths of a uniform-width waveguide are of course the same.

An object of resonators 60, 60' and 80 is to provide an increase in the gas discharge volume for a given waveguide height and length, thereby providing an increase in output power over a corresponding prior art laser resonator having the same number of waveguides, similarly arranged, each waveguide having the same (uniform) width as the uniform-width waveguides in the inventive lasers.

The potential power output increase of an inventive tapered-waveguide laser over the power available in a prior-art laser having the same number of waveguides of the same height, length and inclination, and having uniform width $W_O$, where $W_O$ is the minimum width of a waveguide in the tapered waveguide laser, may be expressed as a ratio $A_T/A_U$. Here $A_T$ is the effective total waveguide area of the inventive tapered-waveguide laser, i.e., the actual total waveguide area less the sum of the overlapping areas. $A_U$ is the total waveguide area of the "equivalent", prior-art, uniform-width-waveguide laser. The waveguide height H for both lasers is assumed to be the same.

Figure 8:
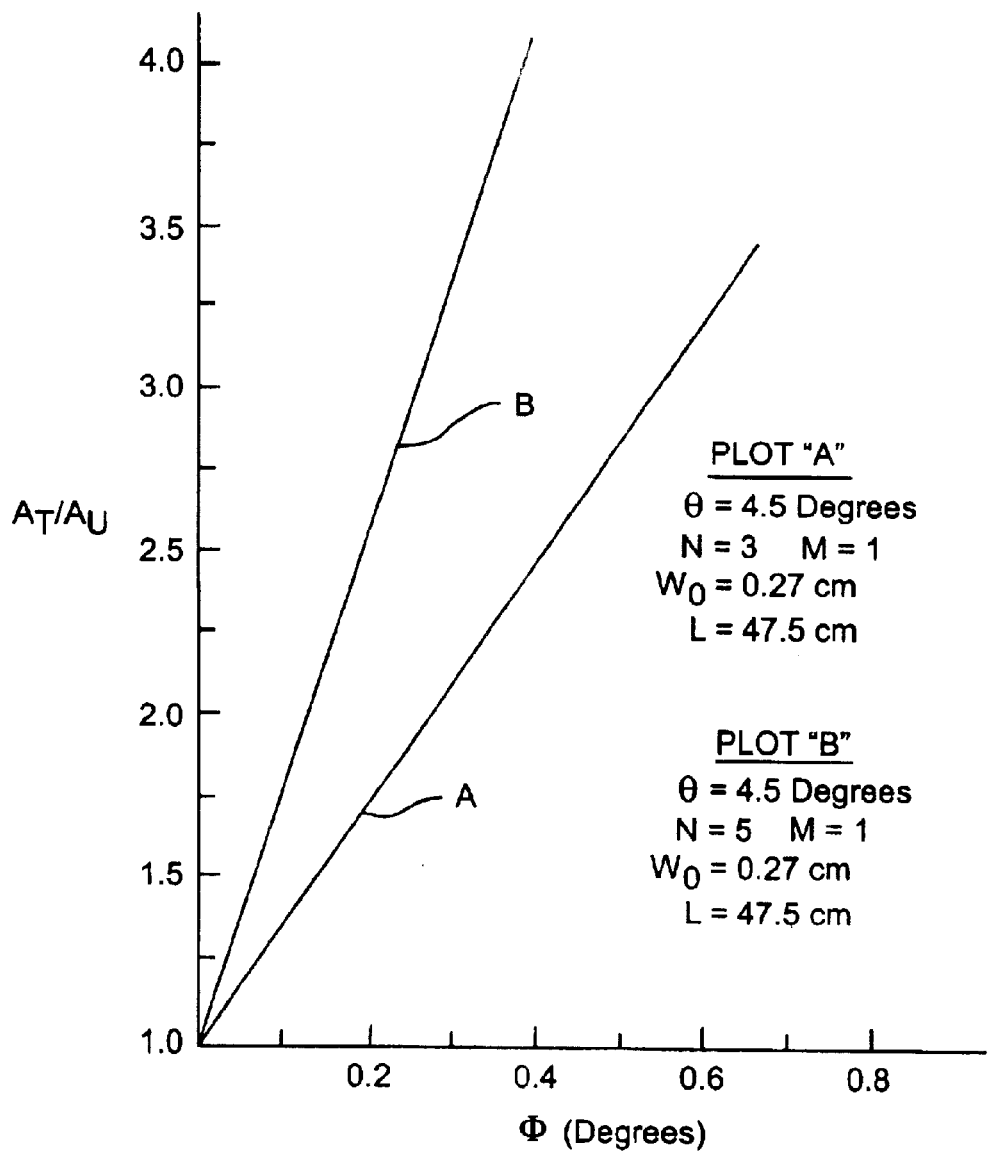
FIG. 8 is a graph schematically illustrating the ratio of the area of waveguides in the resonators of FIGS. 6 and 7 to the area of waveguides in corresponding prior-art resonators having the same number of uniform-width waveguides in similar zigzag arrangements.

FIG. 8 is a graph depicting computed ratios of $A_T/A_U$ for two examples (Plot A and Plot B) of the inventive laser as a function of the taper angle $\Phi$. The number of waveguides (waveguide-channels) is designated by the letter N. Plot A depicts the ratio $A_T/A_U$ for a tapered-waveguide laser having three waveguides or waveguide-channels (N=3) in the configuration of laser resonator 60 of FIG. 5. Inclination angle $\theta$ is 4.5°; $W_O$ is 0.27 cm; the length L of a single waveguide is 47.5 cm. Here again, it is pointed out that, as angle $\theta$ is relatively small, waveguides are all assumed to have the same length regardless of inclination. A prior art uniform-width waveguide laser having the parameters of plot A may have a continuous wave (CW) power output of about 60 W.

Plot B depicts the ratio $A_T/A_U$ for a tapered-waveguide laser having five waveguides (N=5) in the configuration of laser resonator 80 of FIG. 6. Inclination angle $\theta$ is 4.5°; $W_O$ is 0.27 cm; the waveguide length L is 47.5 cm. A prior art uniform-width waveguide laser having the parameters of plot B potentially has a CW power output of about 140 W. It can be seen from the examples of FIG. 8 that a taper angle of only 0.2° may increase the total waveguide area by factors of about 1.7 and 2.5 for the three-waveguide and five-waveguide examples respectively each having one uniform-width, single mode waveguide. This corresponds to potential CW power outputs of about 100 W and 350 W, respectively, from the inventive tapered-waveguide lasers.

It is emphasized, here, that the ratio $A_T/A_U$ represents only the potential power output increases available in examples of the inventive laser. Other factors including waveguide cross-section dimensions, gas pressure, RF frequency, operating temperature, lateral waveguide leakage in areas of waveguide overlap, and specific resonator arrangements may reduce the actual increase in power available.

While the object of above-discussed inventive laser resonators 60, 60', and 80 is primarily an increase in the gas discharge volume and thus an increase in laser output power, progressive widening of waveguides toward one end of the resonators provides for a decrease in the power density, i.e., power per unit cross-section area in an oscillating mode as the mode-width increases. This offers the potential of reduced susceptibility to damage for resonator mirrors and intra-resonator components (not shown in FIGS. 5 and 6) such as thin-film polarizers, electro-optical mirrors, Q-switches, and reflective phase-retarders. A discussion of two embodiments of the inventive tapered-waveguide laser resonator configured to exploit this potential for reduced susceptibility to damage is set forth below with reference to FIG. 9 and FIG. 10.

Figure 9:
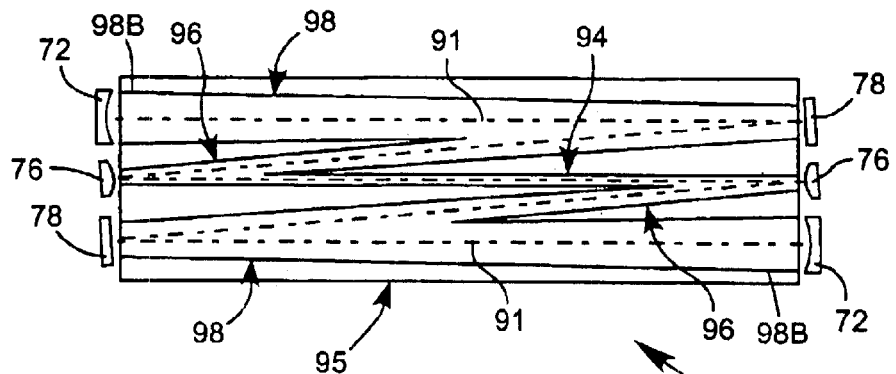
FIG. 9 schematically illustrates yet another preferred embodiment of a laser resonator in accordance with the present invention including a zigzag arrangement of one uniform-width waveguide and four tapered waveguides with the uniform-width waveguide centrally located in the waveguide arrangement.

FIG. 9 schematically depicts a laser resonator 93 in accordance with the present invention having a waveguide-block 95 including one uniform-width waveguide 94, two equally-tapered waveguides 96, and two equally-tapered waveguides 98. Waveguides 96 each have a width increasing from about that of uniform-width waveguide 94 to a first maximum width. Waveguides 98 each have a width increasing from about the maximum width of waveguides 96 to a second maximum width. The waveguides are arranged in an NV-folded zigzag arrangement. Laser resonator 93 is formed between two concave cylindrical mirrors 72. A resonator axis 91 extends through the waveguides. The resonator axis is folded to conform to the zigzag arrangement of waveguides by two convex cylindrical fold-mirrors 76 and 2 plane fold-mirrors 78.

In laser resonator 90, uniform-width waveguide 94 is configured to support only a single oscillation mode, and is centrally located between the tapered waveguides such that waveguide width along the resonator axis progressively increases from opposite ends 94A and 94B of waveguide 94 towards the ends of the resonator. Accordingly, the widest waveguide width is at ends 98B of waveguides 98. A result of this is that the lowest power density in the resonator is incident on resonator end-mirrors 72. Either one of the mirrors 72 can serve as the output mirror of the laser. This waveguide arrangement provides for reduced power density at each end of the laser resonator while still constraining the resonator to operate in only a single mode.

Figure 10:
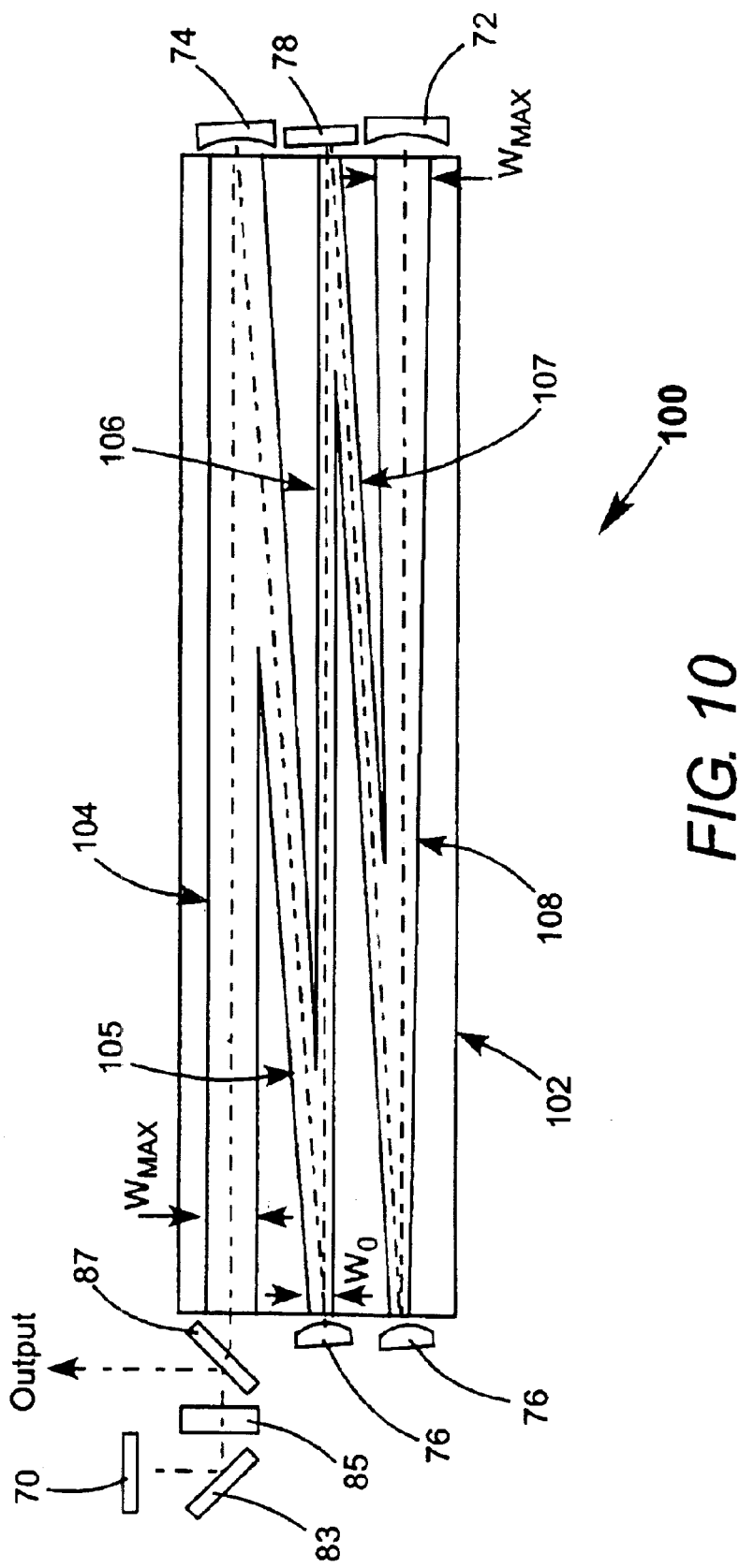
FIG. 10 schematically illustrates still another preferred embodiment of a laser resonator in accordance with the present invention, the resonator including optical components for providing Q-switched cavity-dumped operation and including a zigzag arrangement of waveguides with two uniform-width waveguides centrally located in the arrangement and configured for mode-filtering, two tapered waveguides, and another uniform-width waveguide at an output end of the arrangement and having a width selected to reduce power density on the Q-switching components.

FIG. 10 schematically illustrates an embodiment 100 of a single-mode, Q-switched, cavity-dumped, tapered-waveguide laser-resonator 100 in accordance with the present invention. Resonator 100 is configured to provide reduced power density at the ends of the resonator for reducing damage to intra-resonator components.

Resonator 100 is terminated by a plane mirror 70 and a concave mirror 72. A reflective phase retarder (polarization rotator) 83, an EO-switch 85, and a thin-film polarizer 87 are provided for effecting Q-switching or cavity dumping. In cavity-dumped operation, mirror 70 is a fully reflecting mirror and operation of the EO-switch is arranged to cause pulses of output radiation to be periodically "dumped" from the cavity by reflection from thin-film polarizer 87. In a Q-switched operation, mirror 70 is a partially transmitting mirror and operation of the EO-switch is arranged such that pulses of laser radiation are periodically transmitted through mirror 70. The operation of such a Q-switching and cavity-dumping arrangement is well known in the art to which the present invention pertains, accordingly a detailed description of the operation is not presented herein.

Resonator 100 includes a waveguide-block 102 having five waveguides in total. Considered as a sequence, a first of these waveguides is a uniform-width waveguide 104 having a width $W_{MAX}$ selected to provide a peak power density low enough to reduce the probability of damage to the Q-switching and cavity-dumping components. Following waveguide 104, a waveguide 105 has a width tapered from $W_{MAX}$ to a width $W_0$. Two uniform-width waveguides 106 and 107 having a width $W_0$ follow tapered waveguide 105. Width $W_0$ is selected cooperative with other waveguide parameters as discussed above such that resonator 100 can only oscillate in a single mode. Following the two uniform-width waveguides, another tapered waveguide 108 has a width tapered from $W_0$ to $W_{MAX}$. Resonator 100 has a resonator axis 109 folded by two convex mirrors 76, a plane mirror 78, and a concave mirror 74. The mirror curvatures are selected as discussed above with reference to resonators 60, 80, and 93. A particular advantage of resonator 100 is that uniform-width waveguide 104 provides a reduced power density at the Q-switching components (the output end of the resonator) while still providing a collimated output, which is a single-mode output because of the mode-filtering provided by waveguides 106 and 107.

Figure 11:
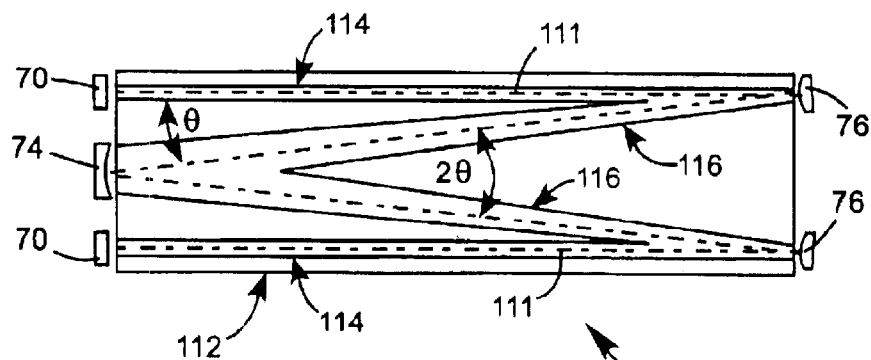
FIG. 11 schematically illustrates a further preferred embodiment of a laser resonator in accordance with the present invention including a zigzag arrangement of two uniform-width waveguide and two tapered waveguides, with one of the uniform-width waveguides at each end the waveguide arrangement.

FIG. 11 schematically depicts a laser resonator 110 in accordance with the present invention having a waveguide-block 112 including a symmetrical arrangement of two uniform-width waveguides 114 having the same width and configured to support only a single oscillating mode, and two equally tapered waveguides 116. The waveguide arrangement may be described as an M-folded zigzag arrangement. Laser resonator 110 is formed between two plane mirrors 70. A resonator axis 111 extends through the waveguides. The resonator axis is folded to conform to the zigzag arrangement of waveguides by two convex cylindrical fold-mirrors 76 and one concave cylindrical fold-mirror 78.

In laser resonator 110, uniform-width waveguides 114 are located at opposite ends of the waveguide arrangement, with tapered waveguides 116 arranged with the widest ends 116B thereof overlapping and narrowest ends 116A thereof overlapping ends 114B of uniform-width waveguides 114. Each of waveguides 116 is inclined at an angle $\theta$ to the adjacent uniform-width waveguide 114. Waveguides 116 are inclined to each other at an angle larger than angle $\theta$. Here, waveguides 116 are inclined at an angle $2\theta$ to each other, although it is not necessary that the inclination angle of waveguides 116 be an exact multiple of angle $\theta$. Increasing the inclination angle between the tapered waveguides decreases the area of overlap, thereby increasing the effective power-providing area of the tapered waveguides.

Figure 12:
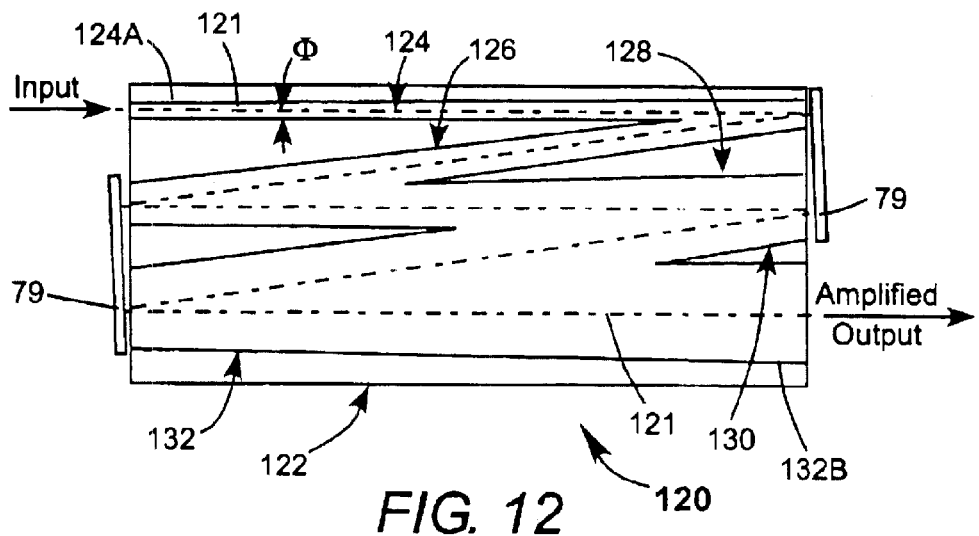
FIG. 12 schematically illustrates one preferred embodiment of a laser-radiation amplifier in accordance with the present invention including a zigzag arrangement of five tapered waveguides.

While embodiments of the present invention are described above with reference to application thereof in a laser resonator, the invention is equally applicable to an amplifier for laser-radiation. FIG. 12 schematically illustrates one preferred embodiment 120 of a laser amplifier in accordance with the present invention. Amplifier 120 includes five tapered waveguides 124, 126, 128, 130, and 132 in a zigzag arrangement. The waveguides are arranged in order of increasing width along an amplifier axis 121, with the narrowest end of one waveguide juxtaposed with and overlapping the widest end of any preceding waveguide. The amplifier axis 121 is folded by plane fold mirrors 79 and 79' to conform to the zigzag pattern of the waveguides. Each of the plane mirrors folds the amplifier axis at two adjacent waveguide junctions. Mirror 79 fold the axis at the at the junction of waveguides 124 and 126 and at the junction of waveguides 128 and 130. Mirror 79' fold the axis at the at the junction of waveguides 126 and 128 and at the junction of waveguides 130 and 132. As noted above, using an extended mirror to fold the axis at two adjacent waveguide-junctions has an advantage that it provides for simpler mirror alignment than would be the case if a separate mirror were located at each of the junctions.

Input radiation from a laser (not shown) is directed into narrowest end 124A of tapered waveguide 124 and proceeds through the waveguides along amplifier axis 121 to exit the amplifier at widest end 132B of waveguide 32. The divergence angle of the laser beam input to the amplifier is made to correspond to the taper angle $\Phi$ of the waveguides of the amplifier. Tapering the waveguides of the amplifier enables the extraction of higher power from the amplifier than would be possible from a prior-art uniform-width waveguide amplifier having the same length of discharge.

Those skilled in the art will recognize from the description given above, without further illustration, that a folded axis, tapered-waveguide laser-amplifier in accordance with the present invention could include a combination of one-or-more uniform-width waveguides and one or more tapered waveguides. This however would necessitate using at least one curved (cylindrical or spherical) folding mirror, and no such combination may be any more effective than the all-tapered-waveguide amplifier of FIG. 12.

The present invention is described above in terms of a preferred and other embodiments. The invention is not limited, however, to the embodiments described and depicted herein. Rather, the present invention is limited only by the claims appended hereto.

What is claimed is:

1. A laser, comprising:

a laser resonator having a resonator axis folded by mirrors into a zigzag pattern, said resonator axis extending through a plurality of waveguides, adjacent ones of said waveguides arranged end-to-end at an angle to each other to conform to the zigzag pattern, each of said waveguides having a length, a height and a width, the width of at least one of said waveguides being tapered from a narrowest width at one end thereof to a widest width at an opposite end thereof.

2. The laser of claim 1, wherein at least one of said waveguides is defined as a mode-filtering waveguide, said mode-filtering waveguide characterized in that it has a first uniform width, said first uniform width of said waveguide selected cooperative with the length and height thereof such that laser-radiation generated in said laser resonator can oscillate in only a single oscillating mode.

3. The laser of claim 2, wherein there are two of said mode-filtering waveguides.

4. The laser of claim 1, wherein one of said waveguides has a first uniform width and one of said waveguides has a second uniform width, with the second uniform width being greater than said first uniform width.

5. The laser of claim 4, wherein at least one of said waveguides is defined as a mode-filtering waveguide, said mode-filtering waveguide characterized in that it has a first uniform width, said first uniform width of said waveguide selected cooperative with the length and height thereof such that laser-radiation generated in said laser resonator can oscillate in only a single oscillating mode.

6. The laser of claim 5, wherein there are two of said mode-filtering waveguides.

7. The laser of claim 6, wherein there are two of said tapered waveguides.

8. The laser of claim 2, wherein there is only one of said mode-filtering waveguides and there are two of said tapered waveguides, the narrowest width of one of said tapered waveguides being about equal to the widest width of the other of said tapered waveguides.

9. The laser of claim 2, wherein there are two of said mode-filtering waveguides and only one of said tapered waveguides, the narrowest width of said tapered waveguide being about equal to said first uniform width.

10. The laser of claim 2, wherein there is only one of said mode-filtering waveguides and there is a first, second, third, and fourth of said tapered waveguides.

11. The laser of claim 10, wherein said mode-filtering waveguide and said first, second, third, and fourth tapered waveguides are arranged end-to-end in the listed order along said folded resonator axis.

12. The laser of claim 10, wherein said first and second tapered waveguides, said mode-filtering waveguide and said third and fourth tapered waveguides are arranged end-to-end in the listed order along said folded resonator axis.

13. The laser of claim 2, wherein there are a first and a second of said mode-filtering waveguides and a first and a second of said tapered waveguides.

14. The laser of claim 13, wherein said first mode-filtering waveguide, said first and second tapered waveguides, and said second mode-filtering waveguide are arranged end-to-end in the listed order along said folded resonator axis.

15. The laser of claim 13, wherein said first and second mode-filtering waveguides, and said first and second tapered waveguides are arranged end-to-end in the listed order along said folded resonator axis, with said widest ends of said tapered waveguides juxtaposed.

16. The laser of claim 1, wherein the angle between adjacent ones of said waveguides is between about 2 degrees and 6 degrees.

17. The laser of claim 1, wherein the angle between all waveguides is the same.

18. The laser of claim 1, wherein the angle between first and second adjacent waveguides is different from the angle between said second and a third adjacent waveguide.

19. The laser of claim 6, wherein said angle between said second and third adjacent waveguides is twice the angle between said first and second adjacent waveguides.

20. The laser of claim 1, wherein said resonator includes a rectangular block of a dielectric material, and wherein each of said waveguides is formed by a channel in said dielectric block.

21. A laser, comprising:

a laser resonator having a resonator axis folded by mirrors into a zigzag pattern, said resonator axis extending through a plurality of waveguides designated the first through the Nth and arranged, in numerical listing order, end-to-end and at an angle to each other to conform to the zigzag pattern, each of said waveguides having a length, a height and a width, and the width of said second through said Nth waveguides being tapered from a narrowest width at one end thereof to a widest width at an opposite end thereof, and said first waveguide having a uniform width selected cooperative with the length and height thereof such that laser-radiation generated in said laser resonator can oscillate in only a single oscillating mode; and wherein the narrowest width of said second waveguide is about equal to the width of said uniform-width waveguide, said tapered waveguides are arranged with the narrowest end of said second waveguide juxtaposed with an end of said first waveguide and with widest end of said second through N−1th waveguides juxtaposed with and about equal in width to the narrowest end of the next.

22. The laser of claim 21, wherein N is three.

23. The laser of claim 21, wherein N is five.

24. A laser, comprising:

a laser resonator having a resonator axis folded by mirrors into a zigzag pattern, said resonator axis extending through a plurality of waveguides designated the first through the Nth and arranged, in numerical listing order, end-to-end and at an angle to each other to conform to the zigzag pattern, each of said waveguides having a length, a height and a width, and the width of said third through said Nth waveguides being tapered from a narrowest width at one end thereof to a widest width at an opposite end thereof, and said first and second waveguides having an equal uniform width selected cooperative with the length and height thereof such that laser-radiation generated in said laser resonator can oscillate in only a single oscillating mode; and wherein the narrowest width of said third waveguide is about equal to the width of said uniform width first and second waveguides, and wherein said tapered waveguides are arranged with the narrowest end of said third waveguide juxtaposed with an end of said second waveguide and with widest end of said third through N−1th waveguides juxtaposed with and about equal in width to the narrowest end of the next.

25. The laser of claim 24, wherein N is 5.

26. A laser, comprising:

a laser resonator having a resonator axis folded by mirrors into a zigzag pattern, said resonator axis extending through first, second, third, fourth, and fifth waveguides arranged end-to-end, in listing order, at an angle to each other to conform to the zigzag pattern, said waveguides having a height a length and a width;

said first waveguide having a width tapering from a widest width at a first end thereof to a narrowest width at an opposite second end thereof;

said second and third waveguides having a uniform width equal to said narrowest width of said first waveguide, said uniform width selected cooperative with said height and length of said waveguides such that said resonator will support only a single oscillating mode;

said fourth waveguide having a width tapering from said uniform width at a first end thereof, said first end being juxtaposed with an end of said third waveguide, to a maximum width at an opposite end; and said fifth waveguide having a uniform width equal to said maximum width of said fourth waveguide.

27. The laser of claim 26, wherein said laser resonator is terminated between first and second mirrors, said first mirror being a plane mirror and said second mirror being a concave mirror, and wherein said resonator includes optical components for Q-switching located on said resonator axis between said first mirror and said fifth waveguide.

28. A laser amplifier, comprising:

a plurality of waveguides arranged end-to-end along an amplifier axis, said amplifier axis being folded by at least two mirrors into a zigzag pattern, adjacent ones of said waveguides arranged at an angle to each other to conform to the zigzag pattern, at least one waveguide having a width tapered from a narrowest width at one end thereof to a widest width at an opposite end thereof; and wherein laser-radiation to be amplified enters said tapered waveguide at said narrowest end thereof and exits said tapered waveguide at said widest end thereof.

29. The laser amplifier of claim 28, wherein said amplifier-axis folding-mirrors are plane mirrors.

30. The laser amplifier of claim 29, wherein there are at least four of said waveguides and one of said two mirrors folds said amplifier axis more than once.

31. The laser amplifier of claim 30, wherein there are first, second, third, fourth and fifth waveguides arranged in listed order, wherein one of said two mirrors folds said amplifier axis at a junction of said first and second waveguides and at a junction of said third and fourth waveguides; and wherein the other of said mirrors folds said amplifier axis at a junction of said second and third waveguide and at a junction of said fourth and fifth waveguides.

32. The laser of claim 28, wherein all of said waveguides are tapered from a narrowest width at one end thereof to a widest width at an opposite end thereof, and wherein said waveguides are arranged in one axial direction with the narrowest end of one thereof juxtaposed with and having the same width as the widest end the preceding one thereof, and wherein laser-radiation to be amplified enters each of said waveguides at said first end thereof and exits said tapered waveguide at said second end thereof.

* * * * *